US011656896B2

(12) United States Patent
Dai et al.

(10) Patent No.: US 11,656,896 B2
(45) Date of Patent: May 23, 2023

(54) REMOTE DESKTOP SYSTEM AND IMAGE DATA SHARING METHOD

(71) Applicant: HUAWEI CLOUD COMPUTING TECHNOLOGIES CO., LTD., Gui'an New District (CN)

(72) Inventors: Xin Dai, Shenzhen (CN); Dekun Liu, Shenzhen (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 205 days.

(21) Appl. No.: 16/904,136

(22) Filed: Jun. 17, 2020

(65) Prior Publication Data

US 2020/0319910 A1  Oct. 8, 2020

Related U.S. Application Data

(63) Continuation of application No. PCT/CN2018/104296, filed on Sep. 6, 2018.

(30) Foreign Application Priority Data

Dec. 22, 2017  (CN) .......................... 201711409087.8

(51) Int. Cl.
*G06F 9/455* (2018.01)
*H04L 61/5069* (2022.01)

(52) U.S. Cl.
CPC ...... *G06F 9/45558* (2013.01); *H04L 61/5069* (2022.05); *G06F 2009/45579* (2013.01); *G06F 2009/45595* (2013.01)

(58) Field of Classification Search
CPC ....... G06F 9/45558; G06F 2009/45579; G06F 2009/45595; H04L 61/2069
See application file for complete search history.

(56) References Cited

U.S. PATENT DOCUMENTS

2010/0017526 A1* 1/2010 Jagannath ........... H04L 67/1002
709/229
2011/0153716 A1  6/2011 Malakapalli et al.
(Continued)

FOREIGN PATENT DOCUMENTS

CN   103780621 A   5/2014
CN   105227523 A   1/2016
(Continued)

OTHER PUBLICATIONS

S Mehmood Hasan; Multicast Application Sharing Tool for the Access Grid Toolkit; 2005; Proceedings of the UK-eScience All hands Meeting; (Year: 2005).*

*Primary Examiner* — Dong U Kim
(74) *Attorney, Agent, or Firm* — Huawei Cloud Computing Technologies Co., Ltd.

(57) ABSTRACT

A remote desktop system includes a primary virtual machine, a plurality of secondary virtual machines, a primary terminal configured to log in to the primary virtual machine, and a secondary terminal configured to log in to a secondary virtual machine. When a user of the primary virtual machine needs to share image data of the primary virtual machine with a user of the secondary terminal for viewing, the primary virtual machine sends the image data to the primary terminal, and then the primary terminal shares the image data with the secondary terminal. This reduces data transmission pressure on a communications network between a virtual machine center and a terminal center.

11 Claims, 5 Drawing Sheets

(56) References Cited

U.S. PATENT DOCUMENTS

| | | | |
|---|---|---|---|
| 2011/0185398 A1* | 7/2011 | Kubota | G06F 21/41 |
| | | | 726/3 |
| 2013/0315246 A1* | 11/2013 | Zhang | H04L 61/103 |
| | | | 370/392 |
| 2014/0359614 A1 | 12/2014 | Spracklen et al. | |
| 2015/0003313 A1* | 1/2015 | Shao | H04L 12/1822 |
| | | | 370/312 |
| 2015/0043335 A1* | 2/2015 | Testicioglu | H04L 47/628 |
| | | | 370/230 |
| 2015/0180673 A1* | 6/2015 | Kuwata | H04L 12/185 |
| | | | 370/254 |
| 2015/0264035 A1* | 9/2015 | Waterhouse | G06F 21/6209 |
| | | | 726/4 |
| 2016/0205024 A1* | 7/2016 | Haran | H04L 47/2483 |
| | | | 370/235 |
| 2016/0364200 A1* | 12/2016 | Beveridge | H04L 12/4633 |
| 2018/0234515 A1* | 8/2018 | Rombakh | H04L 67/42 |

FOREIGN PATENT DOCUMENTS

| | | |
|---|---|---|
| CN | 105281921 A | 1/2016 |
| CN | 105378659 A | 3/2016 |
| CN | 106817607 A | 6/2017 |
| CN | 107025084 A | 8/2017 |
| CN | 108306930 A | 7/2018 |
| EP | 3399725 A1 | 11/2018 |
| WO | 2004021226 A2 | 3/2004 |
| WO | 2016197955 A1 | 12/2016 |

\* cited by examiner

REMOTE DESKTOP SYSTEM AND IMAGE DATA SHARING METHOD

CROSS-REFERENCE TO RELATED APPLICATIONS

This application is a continuation of International Application No. PCT/CN2018/104296, filed on Sep. 6, 2018, which claims priority to Chinese Patent Application No. 201711409087.8, filed on Dec. 22, 2017. The disclosures of the aforementioned applications are hereby incorporated by reference in their entireties.

TECHNICAL FIELD

Aspects of this application relate to the field of computer technologies, and in particular, to a remote desktop system and an image data sharing method applied to the remote desktop system.

BACKGROUND

In a remote desktop system, a terminal used by a user is connected to a virtual machine (VM) of the user by using a network. There are a plurality of servers deployed inside a data center running the VM, and each server may run one or more VMs. The user logs in to the VM of the user by using the terminal, and receives, by using the terminal, image data such as a desktop image transmitted by the VM. After receiving the image data, the terminal decodes and renders the image data, and displays the image data on a display connected to the terminal.

In some scenarios, the user needs to synchronize image information on the VM of the user with another user for viewing. For example, in a virtual classroom, a teacher needs to share a screen with a student for viewing, or a student needs to share a screen with another student for viewing. In the prior art, in a data center running a VM, a VM of a sharer usually sends to-be-shared image data to a VM of a receiver, a VM of each receiver sends the to-be-shared image data to a corresponding terminal, and then each receiver views the to-be-shared image by using the corresponding terminal. In an existing system, because the VM of each receiver sends the to-be-shared image data to the corresponding terminal, a data volume transmitted between the terminal and the VM is large. Consequently, great pressure is caused to a communications network between the terminal and the VM.

SUMMARY

Aspects of this application provide a remote desktop system, to reduce pressure caused by image data sharing to a communications network between a terminal and a VM.

A first aspect of this application provides a remote desktop system, including a primary VM, a plurality of secondary VMs, a primary terminal configured to access the primary VM, and a plurality of secondary terminals configured to access the plurality of secondary VMs, where one secondary VM corresponds to one secondary terminal;

the primary VM is configured to: obtain a first shared list, where the first shared list includes internet protocol (IP) addresses of a plurality of receiver secondary terminals; send the first shared list to the primary terminal; and send first to-be-shared image data to the primary terminal;

the primary terminal is configured to send the first to-be-shared image data to each receiver secondary terminal based on the first shared list; and each receiver secondary terminal is configured to receive the first to-be-shared image data.

In the foregoing system, in an image data sharing process, a data volume transmitted between a VM and a terminal is comparatively small, and network load is reduced.

In a possible design, the first to-be-shared image data is desktop image data of the primary VM.

For example, the primary VM shares own desktop with a user of each secondary terminal for viewing.

In a possible design, the primary terminal is configured to: log in to the primary VM; obtain an IP address of the primary VM; and send the IP address of the primary VM to each secondary terminal;

a first secondary terminal is configured to: log in to a first secondary VM corresponding to the first secondary terminal; and send the IP address of the primary VM to the first secondary VM;

the first secondary VM is configured to obtain a first multicast IP address based on the IP address of the primary VM; and the primary VM is configured to obtain the first multicast IP address based on the IP address of the primary VM.

The primary VM and the secondary VM create a multicast domain by automatically obtaining a multicast IP address, so that a multicast domain is created automatically.

In a possible design, the primary VM is configured to: send a new IP address of the primary VM to the primary terminal; and obtain the second multicast IP address based on the new IP address of the primary VM;

the primary terminal is configured to send the new IP address of the primary VM to each secondary terminal;

the first secondary terminal is configured to send the new IP address of the primary VM to the first secondary VM; and the first secondary VM is configured to obtain a second multicast IP address based on the new IP address of the primary VM.

In the foregoing system, %% ben the IP address of the primary VM is updated, multicast IP address is updated automatically, that is, a new multicast domain is automatically created between the primary VM and the secondary VM.

In a possible design, the primary VM is configured to: obtain an IP address of a second secondary VM and a second shared list, where the second shared list includes an IP address of a receiver secondary terminal; and send a share request to the second secondary VM based on the IP address of the second secondary VM;

the second secondary VM is configured to send second to-be-shared image data to the primary VM according to the share request, where the second to-be-shared image data is desktop image data of the second secondary VM;

the primary VM is configured to send the second to-be-shared image data and the second shared list to the primary terminal; and the primary terminal is configured to send the second to-be-shared image data to each receiver secondary terminal based on the second shared list.

In the foregoing system, image data sharing between secondary VMs is implemented.

A second aspect of this application provides an image data sharing method, applied to the system in the first aspect, including:

obtaining, by the primary VM, a first shared list, where the first shared list includes IP addresses of a plurality of receiver secondary terminals:

sending, by the primary VM, the first shared list to the primary terminal;

sending, by the primary VM, first to-be-shared image data to the primary terminal:

sending, by the primary terminal, the first to-be-shared image data to each receiver secondary terminal based on the first shared list; and receiving, by each receiver secondary terminal, the first to-be-shared image data.

In a possible design, the first to-be-shared image data is desktop image data of the primary VM.

In a possible design, the primary terminal logs in to the primary VM, and obtains an IP address of the primary VM:

the primary terminal sends the IP address of the primary VM to each secondary terminal:

a first secondary terminal logs in to a first secondary VM corresponding to the first secondary terminal; and sends the IP address of the primary VM to the first secondary VM;

the first secondary VM obtains a first multicast IP address based on the IP address of the primary VM: and the primary VM obtains the first multicast IP address based on the IP address of the primary VM.

In a possible design, the primary VM sends a new IP address of the primary VM to the primary terminal, and obtains the second multicast IP address based on the new IP address of the primary VM;

the primary terminal sends the new IP address of the primary VM to each secondary terminal;

the first secondary terminal sends the new IP address of the primary VM to the first secondary VM; and the first secondary VM obtains the second multicast IP address based on the new IP address of the primary VM.

In a possible design, the primary VM obtains an IP address of a second secondary VM and a second shared list, where the second shared list includes an IP address of a receiver secondary terminal:

the primary VM sends a share request to the second secondary VM based on the IP address of the second secondary VM;

the second secondary VM sends second to-be-shared image data to the primary VM according to the share request, where the second to-be-shared image data is desktop image data of the second secondary VM:

the primary VM sends the second to-be-shared image data and the second shared list to the primary terminal; and the primary terminal sends the second to-be-shared image data to each receiver secondary terminal based on the second shared list.

A third aspect of this application provides a primary terminal including a processor and a memory, where the processor communicates with the memory, and the processor is configured to perform the method performed on the primary terminal side in the method provided in the second aspect or any possible design of the second aspect.

A fourth aspect of this application provides a secondary terminal including a processor and a memory, where the processor communicates with the memory, and the processor is configured to perform the method performed on the secondary terminal side in the method provided in the second aspect or any possible design of the second aspect.

A fifth aspect of this application provides a server including a processor and a memory, where the processor communicates with the memory, and the processor is configured to perform the method performed on the primary VM side in the method provided in the second aspect or any possible design of the second aspect.

A sixth aspect of this application provides a server including a processor and a memory, where the processor communicates with the memory, and the processor is configured to perform the method performed on the secondary VM side in the method provided in the second aspect or any possible design of the second aspect.

A seventh aspect of this application provides a primary terminal including at least one module that is configured to perform the method performed on the primary terminal side in the method provided in the second aspect or any possible design of the second aspect.

An eighth aspect of this application provides a secondary terminal including at least one module that is configured to perform the method performed on the secondary terminal side in the method provided in the second aspect or any possible design of the second aspect.

A ninth aspect of this application provides a storage medium, where the storage medium stores program code, and when the program code is run by a server, the server performs the steps performed by the primary VM in the second aspect or any possible design of the second aspect. The storage medium may be a non-volatile storage medium, including but not limited to a flash memory, a hard disk (HDD), or a solid-state drive (SSD).

A tenth aspect of this application provides a storage medium, where the storage medium stores program code, and when the program code is run by a server, the server performs steps performed by the secondary VM in the second aspect or any possible design of the second aspect.

An eleventh aspect of this application provides a storage medium, where the storage medium stores program code, and when the program code is run by a primary terminal, the primary performs steps performed by the primary terminal in the second aspect or any possible design of the second aspect.

A twelfth aspect of this application provides a storage medium, where the storage medium stores program code, and when the program code is run by a secondary terminal, the secondary terminal performs steps performed by the secondary terminal in the second aspect or any possible design of the second aspect.

DESCRIPTION OF EMBODIMENTS

The following describes the technical solutions in the embodiments of this application with reference to the accompanying drawings in the embodiments of this application.

In this application, terms such as first and second are used to distinguish between objects, for example, a first switch and a second switch, but there is no logical or time-sequential dependency between the "first" and the "second".

In this specification, a primary VM has a capability of managing a secondary VM, for example, monitoring a running status of the secondary VM, and remotely controlling the secondary VM. For example, in a scenario of a virtual classroom, the primary VM may be a VM of a teacher, and the secondary VM may be a VM of a student. There may be a plurality of primary VMs in a VM center. Different primary VMs and corresponding secondary VMs form different multicast domains, and one multicast domain is a virtual classroom.

In this specification, a terminal is deployed on a user side. The terminal usually has one or more functions such as encoding, decoding, and rendering. The terminal is usually connected to a display, or a display is disposed inside the terminal, so that a user can view a desktop of a VM and operate the VM by using the terminal.

Remote desktop system applied in the embodiments of this application

Figure 1:
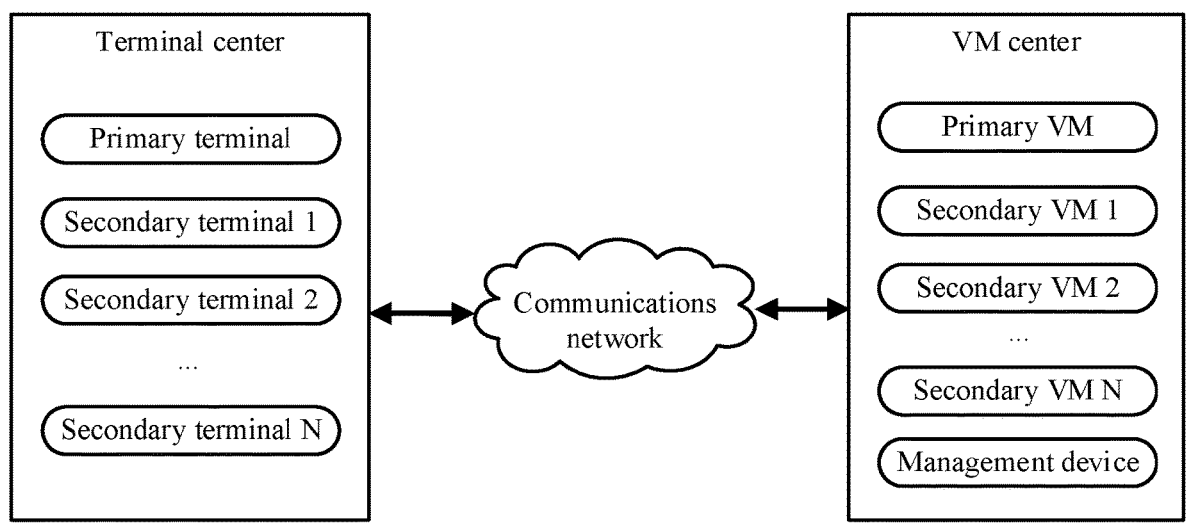
FIG. 1 is a schematic diagram of a remote desktop system according to an embodiment of this application.

As shown in FIG. 1, the remote desktop system includes a VM center and a terminal center. The VM center includes a plurality of servers. The plurality of servers run a primary VM and secondary VMs 1 to N. Each server runs one or more VMs. The VM center further includes a management device. The management device may be a server or a management virtual machine running on a server. The terminal center includes a primary terminal, configured to access the primary VM, and the terminal center further includes secondary terminals 1 to N, respectively configured to access the secondary VMs 1 to N. The VM center and the terminal center communicate with each other by using a communications network. In a scenario of a virtual classroom, the VM center is an equipment room in a school, and the terminal center includes classrooms in the school.

For example, a user 1 accesses the primary VM by using the primary terminal, and users 2 to N+1 access the secondary VMs 1 to N respectively by using the secondary terminals 1 to N. If the user 1 expects to share image data of the primary VM, for example, image data with a size of 5 MB, to displays of the users 2 to N+1 for viewing by the users 2 to N+1. In an existing system, the primary VM first separately sends the image data to the secondary VMs 1 to N. and the secondary VMs 1 to N respectively send the obtained image data to the secondary terminals 1 to N. Therefore, the VM center needs to send data of 5*N MB to the terminal center, causing great pressure to the communications network between the VM center and the terminal center.

To resolve this problem, in the remote desktop system proposed in the present invention, a multicast domain is first established between the primary VM and the secondary VMs. If any VM in the multicast domain needs to share image data, the sharer VM sends the to-be-shared image data to a terminal corresponding to the sharer VM. Then, the terminal corresponding to the sharer VM sends the to-be-shared image data to a receiver terminal, and the receiver terminal displays the to-be-shared image data for the user. In this process, the communications network between the VM center and the terminal center transmits the to-be-shared image data only once. This greatly reduces the pressure on the communications network between the VM center and the terminal center, lowers a design requirement for the communications network, and reduces system construction costs.

Figure 2:
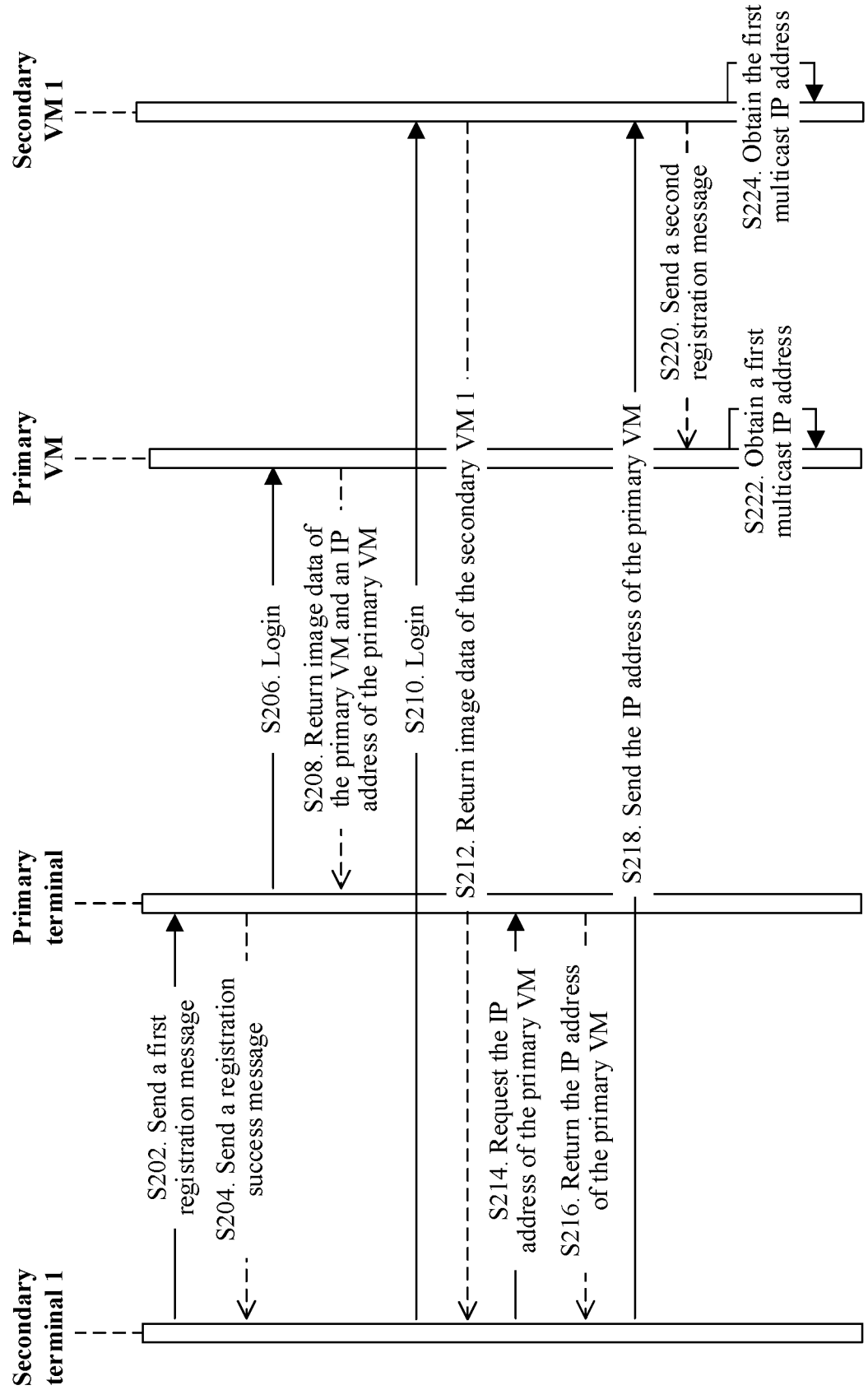
FIG. 2 is a schematic flowchart of a method for establishing a multicast domain according to an embodiment of this application.

As shown in FIG. 2, a method for establishing a multicast domain provided in this application is described by using an example in which a multicast domain is established between a primary terminal, a secondary terminal 1, a primary VM, and a secondary VM 1. For another method of establishing a multicast domain between a secondary terminal and a secondary VM, refer to this example.

S202. The secondary terminal 1 sends a first registration message to the primary terminal, where the first registration message carries an IP address of the secondary terminal 1, and the primary terminal records the IP address of the secondary terminal 1.

Each secondary terminal prestores its own IP address. If another secondary terminal joins the multicast domain in a system, the another secondary terminal also performs step S202.

Therefore, the primary terminal records an IP address of each secondary terminal in the multicast domain after step S202.

S204. The primary terminal sends a registration success message to the secondary terminal 1.

S206. The primary terminal logs in to the primary VM.

Before step S206, the primary terminal requests (obtains) an IP address of the primary VM from a management device.

S208. The primary VM returns the IP address of the primary VM to the primary terminal.

Optionally, the primary VM may further return image data of the primary VM to the primary terminal, so that the primary terminal displays the image data of the primary VM to a user of the primary terminal for viewing.

In steps S206 and S208, the primary terminal successfully logs in to the primary VM, the primary terminal obtains the 1P address of the primary VM, and the primary VM obtains an IP address of the primary terminal. A communication connection is established between the primary VM and the primary terminal for subsequent data transmission.

S210. The secondary terminal 1 logs in to the secondary VM 1.

Because there are usually a plurality of secondary terminals and secondary VMs corresponding to the secondary terminals in the system, before logging in to the secondary VM 1, the secondary terminal 1 needs an IP address of the secondary VM 1. The secondary terminal 1 may prestore the IP address of the secondary VM 1, or the secondary terminal 1 may request the IP address of the secondary VM 1 from the management device before step S210. In a login process, the secondary VM 1 obtains the IP address of the secondary terminal 1.

S212. The secondary VM 1 returns image data of the secondary VM 1 to the secondary terminal 1.

In steps S210 and S212, the secondary terminal 1 successfully logs in to the secondary VM 1, the secondary VM 1 obtains the IP address of the secondary terminal 1, and a communication connection is established between the secondary VM 1 and the secondary terminal 1 for subsequent data transmission.

S214. The secondary terminal 1 requests the IP address of the primary VM from the primary terminal.

S216. The primary terminal returns the IP address of the primary VM to the secondary terminal 1.

S218. The secondary terminal 1 sends the IP address of the primary VM to the secondary VM 1.

S220. The secondary VM 1 sends a second registration message to the primary VM, where the second registration message carries the IP address of the secondary terminal, and may further carry information such as a resolution of the secondary VM 1 and a connection status of the secondary VM 1.

S222. The primary VM obtains a first multicast IP address based on the IP address of the primary VM.

S224. The secondary VM 1 obtains the first multicast IP address based on the IP address of the primary VM.

Steps S222 and S224 may be performed concurrently.

In steps S222 and S224, the primary VM and the secondary VM 1 may obtain the first multicast IP address by using an algorithm. The primary VM and the secondary VM 1 calculate the first multicast IP address by using the same algorithm, to ensure that the primary VM and the secondary VM 1 calculate the same first multicast IP address.

For example, the multicast IP address may be calculated based on a part of the 1P address of the primary VM. The multicast IP address is usually designed based on a particular requirement. For example, a first bit of the multicast IP address is determined based on a design of a network address, a last bit of the multicast IP address is determined based on different modules of the primary VM, and two middle bits of the multicast IP address may be determined based on the IP address of the primary VM, for example, the last two bits of the IP address of the primary VM are used as the two middle bits of the multicast IP address. Therefore, when this algorithm is used, IP addresses of different primary VMs in the system have different last two bits, to avoid overlapping of multicast IP addresses in different multicast domains.

In steps S222 and S224, the primary VM and the secondary VM 1 may further request the first multicast IP address from the management device based on the IP address of the primary VM. The management device presets a multicast IP address corresponding to an IP address of a VM, or the management device calculates a multicast IP address based on an IP address of a VM. The management device obtains a same multicast IP address based on an IP address of a same VM. Because both the primary VM and the secondary VM 1 request the first multicast IP address from the management device based on the IP address of the primary VM, the management device returns the same first multicast IP address to the primary VM and the secondary VM 1.

A range for subsequent data sharing is controlled by establishing the multicast domain. This scenario is common in a virtual classroom. For example, when the primary VM is a VM of a teacher and the secondary VM is a VM of a student, a multicast domain may be automatically established between VMs of all students and a VM of a teacher in each virtual classroom. This avoids broadcasting various data (for example, an operation instruction) between different virtual classrooms, and reduces network load.

Figure 3:
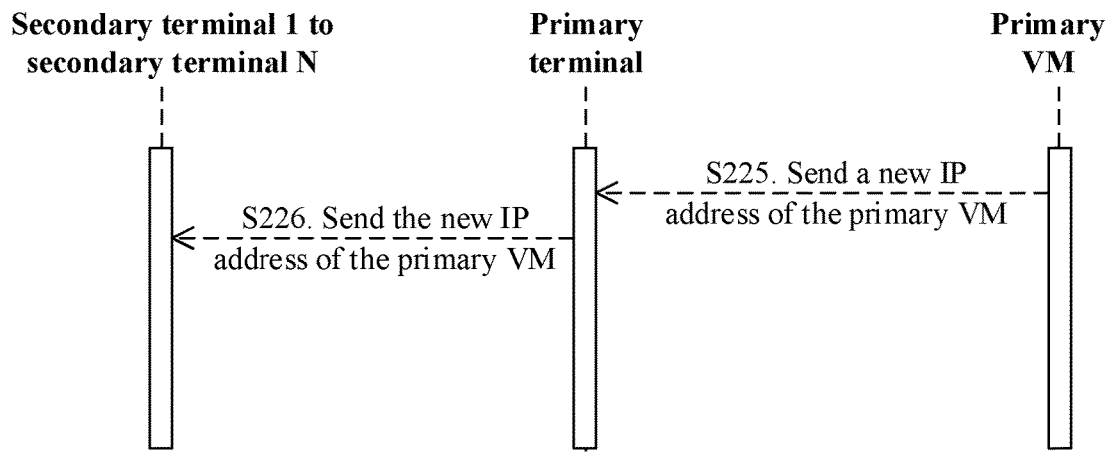
FIG. 3 is a schematic flowchart of a method for updating an IP address of a primary VM according to an embodiment of this application.

FIG. 3 shows a method for updating an IP address of a primary VM when the IP address of the primary VM is changed.

S225. The primary VM sends a new IP address of the primary VM to a primary terminal.

In step S226, because the primary terminal records the IP address of each secondary terminal in the multicast domain after step S202, the primary terminal may send the new IP address of the primary VM to each secondary terminal in the multicast domain.

After step S226, each secondary terminal in the multicast domain obtains the new IP address of the primary VM, and a system re-performs steps S216 to S224. A secondary terminal 1 is used as an example. The secondary terminal 1 sends the new IP address of the primary VM to a secondary VM 1, the secondary VM 1 sends a second registration message to the primary VM, and the primary VM and the secondary VM 1 obtain a second multicast IP address based on the new IP of the primary VM, to implement a function of dynamically updating the multicast domain.

According to the foregoing method, when the IP address of the primary VM is changed, the secondary terminal in the multicast domain can be notified in time, thereby ensuring normal running of the system. For example, when a teacher changes in a virtual classroom, a new teacher needs to log in to a VM of the new teacher by using the primary terminal. In this case, an IP address of the VM of the new teacher needs to be broadcast to a terminal of a student in the original virtual classroom and a new multicast domain is established between the VM of the new teacher and the VM of the student in the virtual classroom.

Figure 4:
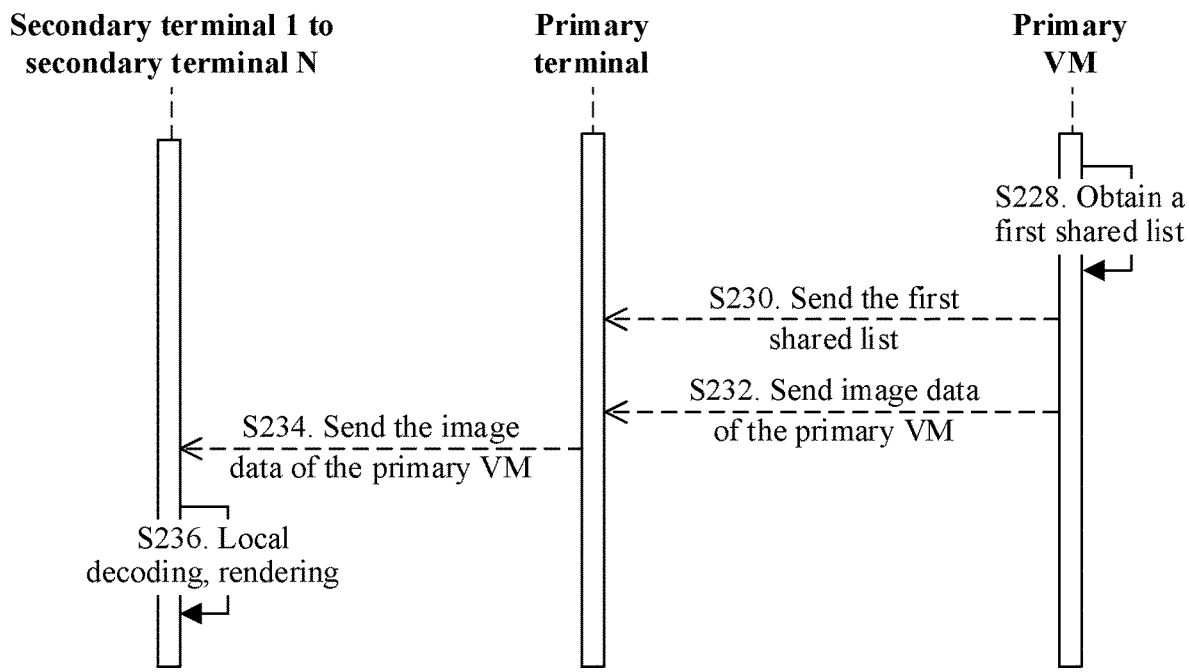
FIG. 4 is a schematic flowchart of an image data sharing method according to an embodiment of this application.

FIG. 4 shows a method in which a primary VM shares image data with each secondary terminal in a multicast domain.

S228. The primary VM obtains a first shared list, where the first shared list includes an IP address of a receiver secondary terminal. For example, a terminal of a student that receives desktop image data shared by a VM of a teacher can be selected on the VM of the teacher, and the first shared list is generated.

S230. The primary VM sends the first shared list to a primary terminal.

S232. The primary VM sends image data of the primary VM, namely, first to-be-shared image data, such as desktop image data of the primary VM to the primary terminal.

S234. The primary terminal obtains the IP address of the receiver secondary terminal from the first shared list, and then the primary terminal sends the image data of the primary VM to the receiver secondary terminal based on the IP address of the receiver secondary terminal.

S236. The receiver secondary terminal receives the image data of the primary VM, performs operations such as decoding and rendering on the image data, and displays the image data to a user by using a display.

The primary terminal records the IP address of each secondary terminal in the multicast domain after step S202. Optionally, the primary terminal may directly obtain the first shared list based on a user input, to replace steps S228 and S230, and then a system performs steps S234 and S236.

According to the foregoing method, when the image data of the primary VM needs to be shared to a plurality of secondary terminals, a VM center does not need to replicate the image data by a plurality of copies and separately send the plurality of copies of image data to the secondary terminals by using a communications network. This reduces transmission pressure on the communications network, and improves data sharing efficiency. For example, when image data of 5 MB needs to be shared to N secondary terminals, the primary VM needs to transmit only the image data of 5 MB to a terminal center. In addition, the method reduces system construction costs.

Figure 5:
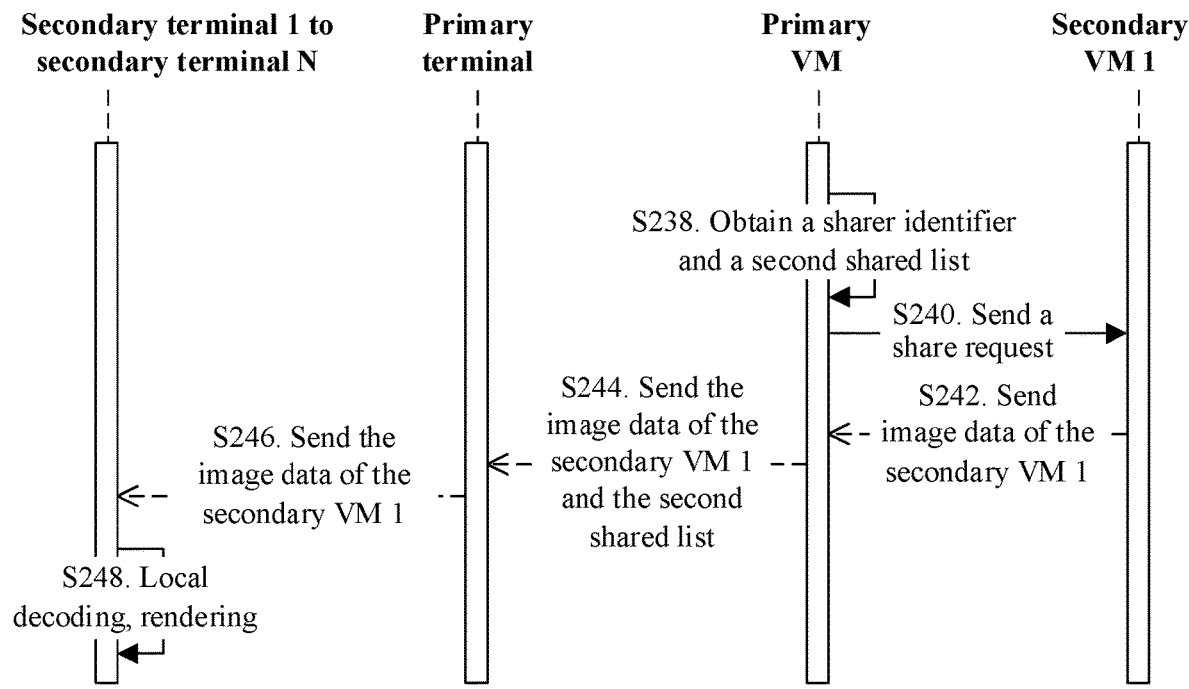
FIG. 5 is a schematic flowchart of an image data sharing method according to an embodiment of this application.

FIG. 5 shows a method in which a secondary VM 1 shares image data with each secondary terminal in a multicast domain.

S238. A primary VM obtains an IP address of the secondary VM 1 and a second shared list.

For the second shared list, refer to the first shared list in step S228, and the second shared list includes an IP address of each receiver secondary terminal.

S240. The primary VM sends a share request to the secondary VM 1 based on the IP address of the secondary VM 1.

S242. The secondary VM 1 sends image data of the secondary VM 1, namely, second to-be-shared image data, to the primary VM.

S244. The primary VM sends the image data of the secondary VM 1 and the second shared list to a primary terminal.

S246. Referring to step S234, the primary terminal sends the image data of the secondary VM 1 to the receiver secondary terminal based on the second shared list.

S248. The receiver secondary terminal receives the image data of the secondary VM 1, performs operations such as decoding and rendering on the image data, and displays the image data to a user by using a display.

Optionally, the share request that is sent by the primary VM to the secondary VM 1 in step S240 may further carry the second shared list. In this case, after step S240, the secondary VM 1 may send the image data of the secondary VM 1 and the second shared list to the secondary terminal 1, and the secondary terminal 1 sends the image data of the secondary VM 1 to each receiver secondary terminal in the second shared list.

Optionally, the secondary terminal 1 may directly obtain the second shared list based on a user input, and send the image data of the secondary VM 1 to each receiver secondary terminal in the second shared list. In this case, steps S238 and S244 do not need to be performed.

According to the foregoing method, when the image data of the secondary VM 1 needs to be shared to a plurality of secondary terminals, a VM center does not need to replicate the image data by a plurality of copies and separately send the plurality of copies of image data to the secondary terminals by using a communications network. This reduces pressure on the communications network, improves data sharing efficiency, and reduces system construction costs.

Figure 6:
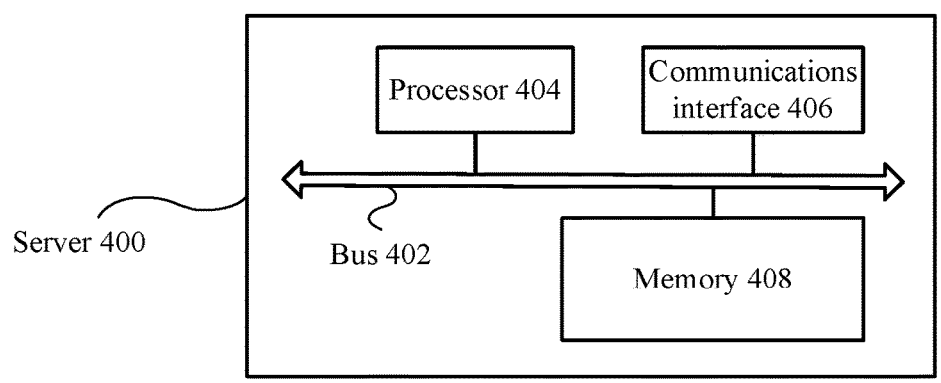
FIG. 6 is a schematic structural diagram of a server running a VM according to an embodiment of this application.

FIG. 6 provides a server 400, and the server 400 may be applied to the foregoing system. The server 400 runs a primary VM or a secondary VM.

The server 400 includes a bus 402, a processor 404, a memory 408, and a communications interface 406. The processor 404, the memory 408, and the communications interface 406 communicate with each other through the bus 402.

The processor 404 may be a central processing unit (CPU). The memory 408 may include a volatile memory, for example, a random access memory (RAM). The memory 408 may further include a non-volatile memory, for example, a read-only memory (ROM), a flash memory, an HDD, or an SSD. The server 400 communicates with another server in a VM center and each terminal in the system by using the communications interface 406.

When the server 400 runs the primary VM, the memory 408 stores a program, and the processor 404 executes the program to perform an action performed on the primary VM side in the foregoing method. Specifically, the steps and an optional solution thereof, that is, steps S208, S222, S225, S228, S230, S232, S238, S240, and S244, are included.

When the server 400 runs the secondary VM, the memory 408 stores a program, and the processor 404 executes the program to perform an action performed on the secondary VM side in the foregoing method. Specifically, the steps and an optional solution thereof, that is, steps S212, S220, S224, and S242, are included.

In the system in which the server 400 is used, to-be-shared image data does not need to be replicated by a plurality of copies and sent to each receiver terminal. This reduces pressure on a communications network, and improves data sharing efficiency.

Figure 7:
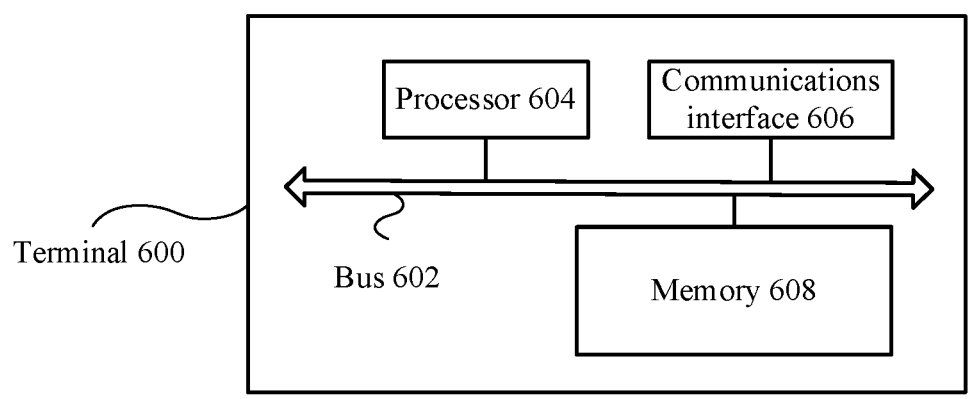
FIG. 7 is a schematic structural diagram of a terminal according to an embodiment of this application.

FIG. 7 provides a terminal 600, and the terminal 600 may be applied to the foregoing system. The terminal 600 may be a primary terminal or a secondary terminal.

The terminal 600 includes a bus 602, a processor 604, a memory 608, and a communications interface 606. The processor 604, the memory 608, and the communications interface 606 communicate with each other through the bus 602.

The processor 604 may be a CPU. The memory 608 may include a volatile memory, for example, a RAM. The memory 608 may further include a non-volatile memory, such as a ROM, a flash memory, an HDD, or an SSD. The terminal 600 communicates with another terminal in a terminal center and each VM in the system by using the communications interface 606.

When the terminal 600 is the primary terminal, the memory 608 stores a program and the processor 604 executes the program to perform an action performed on the primary terminal side in the foregoing method. Specifically, the steps and an optional solution thereof, that is, steps S204, S206, S216, S226, S234, and S246 are included.

When the terminal 600 is the secondary terminal, the memory 608 stores a program, and the processor 604 executes the program to perform an action performed on the secondary terminal side in the foregoing method. Specifically, the steps and an optional solution thereof, that is, steps S202, S210, S214, S218, S236, and S248, are included.

In the system in which the terminal 600 is used, to-be-shared image data does not need to be replicated by a plurality of copies and sent to each receiver terminal. This reduces pressure on a communications network.

Figure 8:
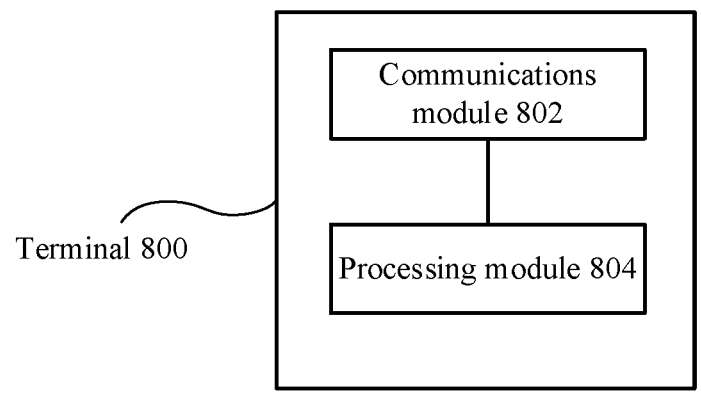
FIG. 8 is another schematic structural diagram of a terminal according to an embodiment of this application.

FIG. 8 provides a terminal 800 including a communications module 802 and a processing module 804. The communications module 802 communicates with another terminal in a terminal center and each VM in a system.

The terminal 800 may be implemented by using an application-specific integrated circuit (ASIC), or implemented by using a programmable logic device (PLD). The PLD may be a complex programmable logic device (CPLD), a field programmable gate array (FPGA), generic array logic (GAL), or any combination of the foregoing devices. The terminal 800 is configured to implement an action on a terminal side in the foregoing method. The terminal 800 may be a primary terminal or a secondary terminal.

In the system in which the terminal 800 is used, to-be-shared image data does not need to be replicated by a plurality of copies and sent to each receiver terminal. This reduces pressure on a communications network.

In the foregoing embodiments, descriptions of the embodiments have different emphases. For parts that are not described in detail in one embodiment, refer to related descriptions of other embodiments.

The methods described with reference to content disclosed in this application may be implemented in a manner of executing a software instruction by a processor. The software instruction may include a corresponding software module. The software module may be stored in a RAM, a flash memory, a read only memory (ROM), an erasable programmable read only memory (EPROM), or an electrically erasable programmable read only memory. (EEPROM), a hard disk, an optical disc, or a storage medium of any other form well-known in the art.

A person of skill in the art should be aware that in one or more of the foregoing examples, the functions described in this application may be implemented by using hardware or software. When the functions are implemented by software, the functions may be stored in a computer-readable medium or transmitted as one or more instructions or code in a computer-readable medium. The storage medium may be any available medium accessible to a general-purpose or special-purpose computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification or improvement made based on the technical solutions of this application shall fall within the protection scope of this application.

What is claimed is:

1. A remote desktop system, comprising:
a primary virtual machine (VM);
a plurality of secondary VMs;
a primary terminal configured to access the primary VM; and
a plurality of receiver secondary terminals configured to access the plurality of secondary VMs, wherein each receiver secondary terminal accesses a corresponding secondary VM;
wherein the primary VM is configured to:
obtain IP addresses of the receiver secondary terminals from the secondary VMs that correspond to the receiver secondary terminals to form obtain a first shared list, wherein the first shared list comprises the IP addresses of the plurality of receiver secondary terminals;
send the first shared list to the primary terminal, and send first to-be-shared image data to the primary terminal;
wherein the primary terminal is configured to:
send the first to-be-shared image data to each receiver secondary terminal based on the first shared list; and
wherein each receiver secondary terminal is configured to receive the first to-be-shared image data.

2. The system according to claim 1, wherein the first to-be-shared image data is desktop image data of the primary VM.

3. The system according to claim 1, wherein:
the primary terminal is configured to log in to the primary VM, obtain an IP address of the primary VM, and send the IP address of the primary VM to each receiver secondary terminal;
a first one of the receiver secondary terminals is configured to log in to a first one of the secondary VMs corresponding to the first secondary terminal, and send the IP address of the primary VM to the first secondary VM;
the first secondary VM is configured to obtain a first multicast IP address based on the IP address of the primary VM; and
the primary VM is configured to obtain the first multicast IP address based on the IP address of the primary VM.

4. The system according to claim 3, wherein:
the primary VM is configured to send a new IP address of the primary VM to the primary terminal, and obtain a second multicast IP address based on the new IP address of the primary VM;
the primary terminal is configured to send the new IP address of the primary VM to each receiver secondary terminal;
the first receiver secondary terminal is configured to send the new IP address of the primary VM to the first secondary VM; and
the first secondary VM is configured to obtain the second multicast IP address based on the new IP address of the primary VM.

5. The system according to claim 3, wherein:
the primary VM is configured to obtain an IP address of a second secondary VM of the plurality secondary VMs and a second shared list, wherein the second shared list comprises an IP address of one of the receiver secondary terminals, and send a share request to the second secondary VM based on the IP address of the second secondary VM;
the second secondary VM is configured to send second to-be-shared image data to the primary VM according to the share request, wherein the second to-be-shared image data is desktop image data of the second secondary VM;
the primary VM is configured to send the second to-be-shared image data and the second shared list to the primary terminal; and
the primary terminal is configured to send the second to-be-shared image data to each receiver secondary terminal based on the second shared list.

6. An image data sharing method implemented in a remote desktop system that comprises a primary virtual machine (VM), a plurality of secondary VMs, a primary terminal configured to access the primary VM, and a plurality of receiver secondary terminals each configured to access a corresponding VM in the plurality of secondary VMs, the method comprising:
obtaining, by the primary VM, IP addresses of the receiver secondary terminals from the secondary VMs that correspond to the receiver secondary terminals to a first shared list, wherein the first shared list comprises the IP addresses of the plurality of receiver secondary terminals;
sending, by the primary VM, the first shared list to the primary terminal;
sending, by the primary VM, first to-be-shared image data to the primary terminal;
sending, by the primary terminal, the first to-be-shared image data to each receiver secondary terminal based on the first shared list; and
receiving, by each receiver secondary terminal, the first to-be-shared image data.

7. The method according to claim 6, wherein the first to-be-shared image data is desktop image data of the primary VM.

8. The method according to claim 6, comprising:
the primary terminal logging in to the primary VM;
the primary terminal obtaining an IP address of the primary VM;
the primary terminal sending the IP address of the primary VM to each receiver secondary terminal;
a first one of the receiver secondary terminals logging in to a first one of the secondary VMs corresponding to the first secondary terminal, and sending the IP address of the primary VM to the first secondary VM;
the first secondary VM obtaining a first multicast IP address based on the IP address of the primary VM; and the primary VM obtaining the first multicast IP address based on the IP address of the primary VM.

9. The method according to claim 8, further comprising:
the primary VM sending a new IP address of the primary VM to the primary terminal;
the primary VM obtaining a second multicast IP address based on the new IP address of the primary VM;
the primary terminal sending the new IP address of the primary VM to each receiver secondary terminal;
the first receiver secondary terminal sending the new IP address of the primary VM to the first secondary VM; and
the first secondary VM obtaining the second multicast IP address based on the new IP address of the primary VM.

10. The method according to claim 8, further comprising:
the primary VM obtaining an IP address of a second secondary VM of the plurality of secondary VMs and a second shared list, wherein the second shared list comprises an IP address of one of the receiver secondary terminals, and the primary VM sending a share request to the second secondary VM based on the IP address of the second secondary VM;
the second secondary VM sending second to-be-shared image data to the primary VM according to the share request, wherein the second to-be-shared image data is desktop image data of the second secondary VM;
the primary VM sending the second to-be-shared image data and the second shared list to the primary terminal; and
the primary terminal sending the second to-be-shared image data to each receiver secondary terminal based on the second shared list.

11. A non-transitory readable storage medium, wherein the non-transient readable storage medium is accessed by a primary VM, a plurality of secondary VMs, a primary terminal, and a plurality of receiver secondary terminals to cause the primary VM, the second VMs, the primary terminal, and the receiver secondary terminals to:
obtain, by the primary VM, IP addresses of the receiver secondary terminals from the secondary VMs that correspond to the receiver secondary terminals to form a first shared list, wherein the first shared list comprises the IP addresses of the plurality of receiver secondary terminals;
send, by the primary VM, the first shared list to the primary terminal;
send, by the primary VM, first to-be-shared image data to the primary terminal;
send, by the primary terminal, the first to-be-shared image data to each receiver secondary terminal based on the first shared list; and
receive, by each receiver secondary terminal, the first to-be-shared image data.

* * * * *